(12) United States Patent
Spaeth et al.

(10) Patent No.: US 6,920,611 B1
(45) Date of Patent: Jul. 19, 2005

(54) METHOD AND SYSTEM FOR IMPLEMENTING A LOYALTY MERCHANT COMPONENT

(75) Inventors: Paul Spaeth, Half Moon Bay, CA (US); Douglas Jones, San Francisco, CA (US); Adam Creighton, Round Rock, TX (US)

(73) Assignee: Visa U.S.A., Inc., San Francisco, CA (US)

( * ) Notice: Subject to any disclaimer, the term of this patent is extended or adjusted under 35 U.S.C. 154(b) by 0 days.

(21) Appl. No.: 10/402,917

(22) Filed: Mar. 27, 2003

Related U.S. Application Data (60) Provisional application No. 60/429,178, filed on Nov. 25, 2002.

(51) Int. Cl.[7] .............................. G06F 3/00; G06F 9/00; G06F 17/00
(52) U.S. Cl. ..................... 715/700; 715/745; 705/39; 705/14; 718/101
(58) Field of Search ................................ 345/745, 700; 705/39, 14; 235/735; 713/185; 707/104.1; 718/101

(56) References Cited

U.S. PATENT DOCUMENTS

| | | |
|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |

(Continued)

FOREIGN PATENT DOCUMENTS

| | | |
|---|---|---|
| AU | 200039412 A1 | 12/2000 |
| BE | 1002756 A6 | 5/1991 |
| CA | 2293944 | 8/2000 |

(Continued)

OTHER PUBLICATIONS

"Internet based secure transactions using encrypting applets and cgi–scripts Independent of browser or server capabilities", 1998, *IBM Research Disclosure*, No. 410116, pp. 800–801.

*Primary Examiner*—Kristine Kincaid
*Assistant Examiner*—Boris Pesin
(74) *Attorney, Agent, or Firm*—Brian N. Young; Townsend and Townsend and Crew, LLP (57) ABSTRACT

A loyalty merchant component for facilitating communications amongst cardholder systems, merchant servers and a loyalty host for purposes of processing loyalty transactions is provided. The loyalty merchant component performs a number of interface functions between the loyalty host and the merchant systems and the cardholder systems.

43 Claims, 2 Drawing Sheets

U.S. PATENT DOCUMENTS

| | | |
|---|---|---|
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,297,026 A * | 3/1994 | Hoffman ..................... 705/14 |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A * | 6/1998 | Storey ..................... 705/14 |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,016,484 A * | 1/2000 | Williams et al. ............... 705/39 |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |

| | | | |
|---|---|---|---|
| 6,052,690 A | 4/2000 | de Jong | |
| 6,052,785 A | 4/2000 | Lin et al. | |
| 6,055,509 A | 4/2000 | Powell | |
| 6,061,660 A | 5/2000 | Eggleston et al. | |
| 6,067,526 A | 5/2000 | Powell | |
| 6,070,147 A | 5/2000 | Harms et al. | |
| 6,073,238 A | 6/2000 | Drupsteen | |
| 6,076,068 A | 6/2000 | DeLapa et al. | |
| 6,076,069 A | 6/2000 | Laor | |
| 6,076,164 A * | 6/2000 | Tanaka et al. | 713/185 |
| 6,089,611 A | 7/2000 | Blank | |
| 6,094,656 A | 7/2000 | De Jong | |
| 6,101,422 A | 8/2000 | Furlong | |
| 6,101,477 A | 8/2000 | Hohle et al. | |
| 6,105,002 A | 8/2000 | Powell | |
| 6,105,865 A | 8/2000 | Hardesty | |
| 6,105,873 A | 8/2000 | Jeger | |
| 6,112,987 A | 9/2000 | Lambert et al. | |
| 6,112,988 A | 9/2000 | Powell | |
| 6,119,933 A | 9/2000 | Wong et al. | |
| 6,119,945 A | 9/2000 | Muller et al. | |
| 6,122,631 A | 9/2000 | Berbec et al. | |
| 6,129,274 A | 10/2000 | Suzuki | |
| 6,144,948 A | 11/2000 | Walker et al. | |
| 6,151,586 A | 11/2000 | Brown | |
| 6,151,587 A | 11/2000 | Matthias | |
| 6,154,751 A | 11/2000 | Ault et al. | |
| 6,161,870 A | 12/2000 | Blank | |
| 6,164,549 A | 12/2000 | Richards | |
| 6,170,061 B1 | 1/2001 | Beser | |
| 6,173,269 B1 | 1/2001 | Solokl et al. | |
| 6,173,891 B1 | 1/2001 | Powell | |
| 6,179,205 B1 | 1/2001 | Sloan | |
| 6,179,710 B1 | 1/2001 | Sawyer et al. | |
| 6,183,017 B1 | 2/2001 | Najor et al. | |
| 6,185,541 B1 | 2/2001 | Scroggie et al. | |
| 6,189,100 B1 | 2/2001 | Barr et al. | |
| 6,189,878 B1 | 2/2001 | Dorf | |
| 6,195,666 B1 | 2/2001 | Schneck et al. | |
| 6,210,276 B1 | 4/2001 | Mullins | |
| 6,216,014 B1 | 4/2001 | Proust et al. | |
| 6,216,204 B1 | 4/2001 | Thiriet | |
| 6,220,510 B1 | 4/2001 | Everett et al. | |
| 6,222,914 B1 | 4/2001 | McMullin | |
| 6,230,143 B1 | 5/2001 | Simons et al. | |
| 6,237,145 B1 | 5/2001 | Narasimhan et al. | |
| 6,241,287 B1 | 6/2001 | Best et al. | |
| 6,243,687 B1 | 6/2001 | Powell | |
| 6,243,688 B1 | 6/2001 | Kalina | |
| 6,244,958 B1 | 6/2001 | Acres | |
| 6,266,647 B1 | 7/2001 | Fernandez | |
| 6,267,263 B1 | 7/2001 | Emoff et al. | |
| 6,269,158 B1 | 7/2001 | Kim | |
| 6,279,112 B1 | 8/2001 | O'Toole, Jr. et al. | |
| 6,282,516 B1 | 8/2001 | Giuliani | |
| 6,292,785 B1 | 9/2001 | McEvoy et al. | |
| 6,292,786 B1 | 9/2001 | Deaton et al. | |
| 6,296,191 B1 | 10/2001 | Hamann et al. | |
| 6,299,530 B1 | 10/2001 | Hansted et al. | |
| 6,321,208 B1 | 11/2001 | Barnett et al. | |
| 6,345,261 B1 * | 2/2002 | Feidelson et al. | 705/14 |
| 6,385,723 B1 | 5/2002 | Richards | |
| 6,390,374 B1 | 5/2002 | Carper et al. | |
| 6,409,080 B2 * | 6/2002 | Kawagishi | 235/375 |
| 6,480,935 B1 | 11/2002 | Carper et al. | |
| 6,549,773 B1 | 4/2003 | Linden et al. | |
| 6,549,912 B1 * | 4/2003 | Chen | 707/104.1 |
| 6,612,490 B1 | 9/2003 | Herrendoerfer et al. | |
| 6,681,995 B2 | 1/2004 | Sukeda et al. | |
| 6,689,345 B2 | 2/2004 | Jager Lezer | |
| 2002/0002468 A1 | 1/2002 | Spagna et al. | |
| 2002/0076051 A1 | 6/2002 | Nii | |

FOREIGN PATENT DOCUMENTS

| | | |
|---|---|---|
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 0039297 A | 5/2001 |
| KR | 0044823 A | 6/2001 |
| KR | 0058742 A | 7/2001 |
| KR | 0021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |
| WO | WO 97/05582 A1 | 2/1997 |
| WO | WO 97/10562 A1 | 3/1997 |
| WO | WO 97/39424 A1 | 10/1997 |
| WO | WO 98/02834 A1 | 1/1998 |
| WO | WO 98/09257 A1 | 3/1998 |
| WO | WO 98/20465 A1 | 5/1998 |
| WO | WO 98/43169 A2 | 10/1998 |
| WO | WO 98/43212 A1 | 10/1998 |
| WO | WO 98/52153 A2 | 11/1998 |
| WO | WO 99/10824 A1 | 3/1999 |
| WO | WO 99/16030 A1 | 4/1999 |
| WO | WO 99/19846 A2 | 4/1999 |
| WO | WO 99/44172 A1 | 9/1999 |
| WO | WO 99/45507 A1 | 9/1999 |
| WO | WO 99/49415 A2 | 9/1999 |
| WO | WO 99/49426 A1 | 9/1999 |
| WO | WO 00/39714 A1 | 7/2000 |
| WO | WO 00/46665 A2 | 8/2000 |
| WO | WO 00/54507 A1 | 9/2000 |

| | | | | | | | |
|---|---|---|---|---|---|---|---|
| WO | WO 00/57315 | A2 | 9/2000 | WO | WO 01/52575 | A1 | 7/2001 |
| WO | WO 00/57613 | A1 | 9/2000 | WO | WO 01/55955 | A1 | 8/2001 |
| WO | WO 00/62265 | A1 | 10/2000 | WO | WO 01/59563 | A1 | 8/2001 |
| WO | WO 00/62472 | A1 | 10/2000 | WO | WO 01/61620 | A1 | 8/2001 |
| WO | WO 00/67185 | A1 | 11/2000 | WO | WO 01/65545 | A2 | 9/2001 |
| WO | WO 00/68797 | A1 | 11/2000 | WO | WO 01/67694 | A1 | 9/2001 |
| WO | WO 00/68902 | A1 | 11/2000 | WO | WO 01/71648 | A2 | 9/2001 |
| WO | WO 00/68903 | A1 | 11/2000 | WO | WO 01/71679 | A2 | 9/2001 |
| WO | WO 00/69183 | A2 | 11/2000 | WO | WO 01/73530 | A2 | 10/2001 |
| WO | WO 00/75775 | A2 | 12/2000 | WO | WO 01/73533 | A1 | 10/2001 |
| WO | WO 00/77750 | A1 | 12/2000 | WO | WO 01/78020 | A1 | 10/2001 |
| WO | WO 01/04851 | A1 | 1/2001 | WO | WO 01/80563 | A1 | 10/2001 |
| WO | WO 01/06341 | A1 | 1/2001 | WO | WO 01/84377 | A2 | 11/2001 |
| WO | WO 01/08087 | A1 | 2/2001 | WO | WO 01/84474 | A2 | 11/2001 |
| WO | WO 01/13572 | A1 | 2/2001 | WO | WO 01/84512 | A1 | 11/2001 |
| WO | WO 01/15397 | A1 | 3/2001 | WO | WO 01/88705 | A1 | 11/2001 |
| WO | WO 01/18633 | A1 | 3/2001 | WO | WO 02/06948 | A1 | 1/2002 |
| WO | WO 01/18746 | A1 | 3/2001 | WO | WO 02/10962 | A1 | 2/2002 |
| WO | WO 01/29672 | A1 | 4/2001 | WO | WO 02/14991 | A2 | 2/2002 |
| WO | WO 01/33390 | A2 | 5/2001 | WO | WO 02/15037 | A1 | 2/2002 |
| WO | WO 01/40908 | A2 | 6/2001 | WO | WO 02/21315 | A1 | 3/2002 |
| WO | WO 01/42887 | A2 | 6/2001 | WO | WO 02/29577 | A2 | 4/2002 |
| WO | WO 01/44900 | A2 | 6/2001 | WO | WO 02/088895 | A2 | 11/2002 |
| WO | WO 01/44949 | A2 | 6/2001 | | | | |
| WO | WO 01/47176 | A1 | 6/2001 | | | | |
| WO | WO 01/50229 | A2 | 7/2001 | | | | |

* cited by examiner

METHOD AND SYSTEM FOR IMPLEMENTING A LOYALTY MERCHANT COMPONENT

CROSS-REFERENCES TO RELATED APPLICATION(S)

The present application claims the benefit of priority under 35 U.S.C. §119 from U.S. Provisional Patent Application Ser. No. 60/429,178, entitled "METHOD AND SYSTEM FOR IMPLEMENTING A LOYALTY MERCHANT COMPONENT", filed on Nov. 25, 2002, the disclosure of which is hereby incorporated by reference in its entirety for all purposes.

BACKGROUND OF THE INVENTION

The present invention generally relates to computerized loyalty programs, and more specifically, to an interface component designed to communicate with a computerized loyalty program over a computer network.

A number of software products are available on the market today that are capable of handling loyalty programs in a computerized and automated manner. These products, however, are designed to work independently with back office systems located at respective merchant locations. That is, the software product is usually confined to a single merchant location. The software product only manages the loyalty program associated with that particular merchant location. Different copies of the same software product do not communicate with one another. Very often, these products only capture data at their respective locations and then forward the data to a central location on a periodic basis for merely reporting purposes. Remote access to these products from an external location is typically not provided at all or only on a minimal basis. Moreover, user interfaces for customers are usually nonexistent or lacking user-friendly features. This is because, under conventional practice, customers generally do not interact directly with the software product managing the loyalty program.

With electronic commerce moving onto the Internet, the management of loyalty programs has taken on a more centralized approach. The software product for managing the loyalty program is now generally located on a central server at a single location. Client computers located at merchant locations are used to communicate with the central server to process the desired loyalty transaction via the Internet. Furthermore, a large number of customers are conducting purchase transactions over the Internet, often in the convenience of their own homes or places of work. As a result, functions relating to a loyalty transaction that used to be performed by a store clerk may now need to be handled by the customer him/herself.

Hence, it would be desirable to provide an interface component that is capable of providing more effective and user-friendly communications with a computerized loyalty program over a computer network.

BRIEF SUMMARY OF THE INVENTION

A loyalty merchant component for facilitating communications amongst cardholder systems, merchant servers and a loyalty host for purposes of processing loyalty transactions is provided. In one exemplary aspect, the loyalty merchant component performs a number of interface functions between the loyalty host and the merchant systems and the cardholder systems.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
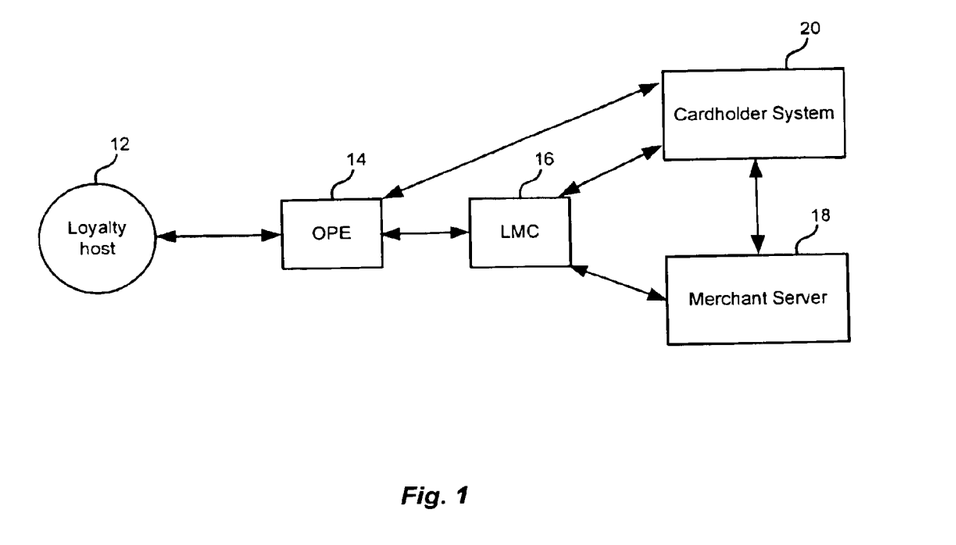
FIG. 1 is a simplified schematic diagram illustrating one exemplary embodiment in accordance with the present invention.

The present invention in the form of one or more exemplary embodiments will now be described. Referring to FIG. 1, there is shown an exemplary embodiment of the present invention. This exemplary embodiment includes a system 10 having a loyalty host 12, an open programming engine (OPE) 14, a merchant server 18, a customer or cardholder system 20 and a loyalty merchant component (LMC) 16. While only one merchant server 18 and one cardholder system 20 are shown, it should be understood that the system 10 is able to accommodate multiple merchant servers and multiple cardholder systems. It should also be understood that while a loyalty program is described below in connection with the loyalty host 12, the loyalty host 12 is capable of maintaining rules and logic for multiple loyalty programs.

In an exemplary embodiment, a smartcard is used to facilitate loyalty transactions conducted in connection with a cardholder and store the relevant transaction information. The cardholder system 20 includes a personal computer (PC), a card reader coupled to the PC for accessing the smartcard, and client loyalty component installed on the PC. The client loyalty component interfaces with one or more smartcard applications residing on the smartcard and with a web browser on the PC, sending information from the web browser to the OPE 14 and the merchant server 18. The client loyalty component is installed on PCs that are eligible to participate in corresponding loyalty programs maintained by the loyalty host 12. In an alternative embodiment, the respective functionality of the card reader, the client loyalty component, the web browser and/or one or more smartcard applications can be combined on the PC. Based on the disclosure and teachings provided herein, a person of ordinary skill in the art will know of other ways and/or methods to implement the functionality of the cardholder system 20 as described above in either an integrated or modular manner and a person of ordinary skill in the art will also appreciate other systems that can be used as the cardholder system 20. For example, in addition to the smartcard, other portable devices or tokens can be used including a cellular phone, a personal digital assistant, a pager, a payment card (such as a credit card and an ATM card), a security card, an access card, smart media, a transponder and the like; and in addition to the PC, other access systems that are able to communicate with different portable devices can be used including a point-of-sale device, a cellular phone, a PDA, a handheld specialized reader, a set-top box, a kiosk, a security system, an access system, and the like.

The OPE 14 is used by the loyalty host 12 to communicate with the outside world. The OPE 14 is a middleware application that acts as an authentication mechanism to authenticate the stored rewards on the smartcard. The OPE 14 also provides rules and logic to authenticate and validate rewards available for each transaction at a merchant website. The merchant website is managed by the merchant server 18 whose function is to handle transactions and payment processing.

The LMC 16 is a hosted programmatic entity that coordinates communications amongst the OPE 14, the cardholder system 20 and the merchant server 18 to allow loyalty transactions to be processed. For example, the LMC 16 delivers webpages and client controls to the web browser associated with the cardholder system 20. In an exemplary implementation, the LMC 16 and the OPE 14 reside on the same server. In other exemplary implementations, however, the LMC 16 and the OPE 14 may reside on separate servers, or operate as the same application.

Figure 2:
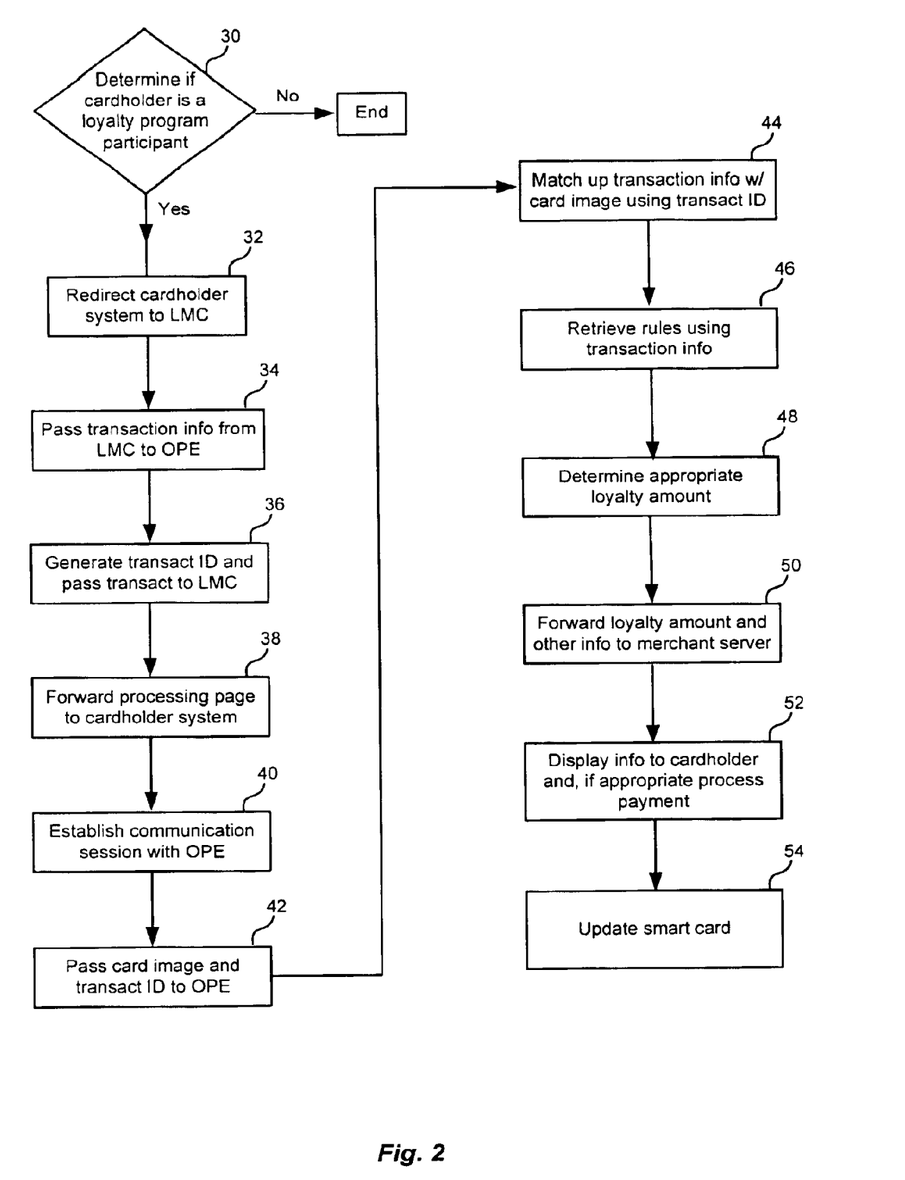
FIG. 2 is a flow chart illustrating the operations of an exemplary embodiment of the present invention.

The LMC 16 coordinates the communications amongst the OPE 14, the cardholder system 20 and the merchant server 18 in the following exemplary manner. FIG. 2 is a flow chart illustrating the operations of the system 10 in accordance with the present invention. At 30, when the cardholder has finished shopping a merchant website and is ready to check out the purchased items, the merchant server 18 communicates with the cardholder system 20 to determine if the cardholder is entitled or eligible to participate in a loyalty program, i.e., whether the cardholder is a loyalty program client or participant in the loyalty program. In one exemplary implementation, this is accomplished by the merchant server 18 checking with the cardholder system 20 to determine if the client loyalty component is installed on the PC. In other exemplary implementations, however, the merchant server 18 may communicate with the LMC 16 to determine if the cardholder is entitled or eligible to participate in a loyalty program.

If it is determined that the cardholder is a loyalty program client, at 32, the merchant server 18 forwards or posts a script to the web browser on the PC, in effect, redirecting the cardholder system 20 to the LMC 16 for further processing. That is, based on the script provided by the merchant server 18, the web browser establishes a communication session with the LMC 16. In addition, the script sent by the merchant server 18 also includes certain transaction information relating to the loyalty transaction to be processed for the cardholder. The transaction information includes, for example, item purchased, purchase amount, and merchant identification information. As will be further described below, the transaction information is eventually forwarded to the loyalty host 12 and used to calculate the appropriate loyalty reward for the transaction being processed. In other exemplary implementations, messages or function calls can be used in lieu of the script. A person of ordinary skill in the art will know of other ways and/or methods to implement the functionality of the script as described herein.

When the web browser executes the script received from the merchant server 18, the web browser is redirected to the LMC 16. During this redirect process, at 34, some or all of the transaction information previously received from the merchant server 18 is passed from the cardholder system 20 to the LMC 16 which, in turn, forwards the information to the OPE 14.

At 36, using the transaction information forwarded by the LMC 16, the OPE 14 generates a transaction ID for the transaction being processed. The transaction information is then linked to the transaction ID. The OPE 14 retains the transaction ID and forwards a copy of the transaction ID to the LMC 16.

At 38, the LMC 16 then forwards a processing page including, scripts and/or applets, to the web browser. The processing page also includes the transaction ID that has been generated by the OPE 14. From a cardholder perspective, one or more of the scripts direct the web browser to construct a processing window which is then displayed to the cardholder. One or more of the applets are used to communicate with the client loyalty component. The client loyalty component includes a transaction interface applet that is capable of establishing communication with the OPE 14.

At 40, the applet(s) received from LMC 16 activates the transaction interface applet and causes a separate communication session to be established between the OPE 14 and the web browser. In other words, the LMC 16 provides a wake-up call to the client loyalty component, more specifically, the transaction interface applet. At this point, there are two concurrent communication sessions. In addition to the communication session between the web browser and the OPE 14, as mentioned above, the web browser also has an active communication session with the LMC 16.

When the transaction interface applet is activated, the card image is retrieved from the smartcard via the cardholder system 20. The card image contains information about the cardholder. In instances where portable devices or tokens are used, images from such devices or tokens are retrieved. At 42, the card image and the transaction ID are passed from the web browser to the LMC 16. The LMC 16 then relays the card image and the transaction ID to the OPE 14. The OPE 14 has a record of all the transaction IDs. Therefore, in a situation where the OPE 14 is in contact with multiple web browsers, the OPE 14 is able to match up and specifically identify the respective card images with the relevant transaction information.

At this point at 44, using the transaction ID, the OPE 14 is able to associate the card image with the transaction information relating to the transaction being processed that was previously generated by the merchant server 18 and forwarded to the OPE 14 from the LMC 16.

At 46, using the transaction information, the OPE 14 then communicates with the loyalty host 12 and retrieves the proper rules and logic for processing the loyalty transaction. For example, the OPE 14 uses the transaction information to retrieve rules and logic that are specific to the merchant. The merchant may have different sets of rules and logic for different types of loyalty programs. For instance, the merchant may co-sponsor a specific loyalty program with a particular issuer.

At 48, the transaction information and information from the card image are checked against the rules and logic to determine the appropriate loyalty amount to be awarded. In other words, the purchase and merchant information and the cardholder information are evaluated by the OPE 14 to determine the appropriate loyalty amount to be awarded.

In some situations, the transaction being processed may be eligible for reward under a number of loyalty programs. When those situations occur, the OPE 14 first determines which loyalty program(s) are to be used for calculating the loyalty reward(s). In order to determine which loyalty programs apply, the OPE 14 directs the LMC 16 to request the cardholder to make a choice. In one exemplary implementation, the LMC 16 forwards a script or webpage to the web browser causing the relevant information to be displayed. The cardholder may be allowed to redeem one or more rewards under different loyalty programs. Upon the cardholder making a choice, the information is relayed from the cardholder system 20 to the OPE 14. The OPE 14 then accordingly calculates the appropriate loyalty reward(s).

Next, the merchant website is to be updated with the information relating to the selected loyalty reward(s). This is done so that the cardholder is given the latest information relating to his/her purchase. More specifically, at 50, the OPE 14 forwards the information relating to the selected loyalty reward(s) to the LMC 16 which, in turn, passes the information to the merchant website. The merchant website then uses the information to regenerate the appropriate webpage for the cardholder showing the latest purchase information. For example, the webpage can show the loyalty reward(s) redeemed and the updated total purchase price. In addition, the OPE 14 also passes certain information relating to the smartcard to the merchant website via the LMC 16. This information includes, for example, the PAN, i.e., the credit card account number and the associated expiration date. This information is retrieved from the card image. This information from the card image allows the merchant website to know that the smartcard offered for payment is the same as the one that is entitled to participate in the loyalty program.

At 52, the PAN and other information are then displayed by the merchant website to the cardholder for approval. When the cardholder approves or confirms payment for the transaction, the merchant website accordingly processes the payment. Other exemplary implementations allow the cardholder to cancel or reselect loyalty reward(s), without canceling the transaction.

At 54, once the payment is processed, the merchant website notifies the LMC 16 that payment has processed and that loyalty status is to be updated. The merchant website also passes certain transaction information to the LMC 16 including, for example, the loyalty reward applied. The LMC 16, in turn, relays the appropriate information to the OPE 14. This transaction information can be further checked against the information that was previously forwarded from the OPE 14 to the merchant website. For example, the loyalty reward applied by the merchant website should be the same as the loyalty reward previously calculated by the OPE 14. The OPE 14 then updates the smartcard to reflect the status of the cardholder's participation in the loyalty program. More specifically, the OPE 14 creates an updated card image for the smartcard and forwards the updated card image to the cardholder system 20 to allow the cardholder system 20 to update the smartcard.

Finally, the LMC 16 can also forward a script or webpage to the web browser causing a window to be display to the cardholder confirming update of the smartcard and showing the relevant information.

In exemplary applications, the present invention is used to allow loyalty program participants to participate in loyalty programs via computers located at home and/or places of work.

In one alternative exemplary embodiment, there are multiple OPEs 14, LMCs 16 and merchant servers 18. Each OPE 14 is associated with a LMC 16 which, in turn, is associated with a merchant server 18. In another alternative exemplary embodiment, a single OPE 16 is capable of handling communications from a number of LMCs 16. Based on the disclosure and teachings provided herein, a person of ordinary skill in the art will know of other ways and/or methods to construct different configurations in accordance with the present invention.

It should be understood that the present invention as described above can be implemented using software, hardware, or a combination of both, in the form of control logic. Based on the disclosure and teachings provided herein, a person of ordinary skill in the art will know of the appropriate ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for processing a transaction under a loyalty program, comprising:
   a loyalty host configured to maintain rules and logic relating to the loyalty program;
   a cardholder system configured to retrieve and forward a device image from a portable device, the device image including portable device information and loyalty program information relating to a cardholder;
   a merchant server configured to provide transaction information relating to the transaction;
   an open programming engine (OPE) configured to retrieve the rules and logic relating to the loyalty program based on the transaction information and determine a loyalty amount for the transaction using the rules and logic and the device image; and
   a loyalty merchant component (LMC) configured to facilitate interactions amongst the OPE, the cardholder system and the merchant server for purposes of processing the transaction under the loyalty program, wherein the LMC is configured to receive the transaction information from the merchant server and forward the transaction information to the OPE and configured to receive the device image from the cardholder system and forward the device image to the OPE.

2. The system of claim 1 wherein the LMC is further configured to:
   receive the transaction information from the merchant server via the cardholder system;
   forward the transaction information to the OPE to allow the OPE to generate a transaction ID linked to the transaction information;
   forward the transaction ID from the OPE to the cardholder system to allow the device image to be linked to the transaction ID; and
   forward the device image and the transaction ID from the cardholder system to the OPE to allow the OPE to match the transaction information to the device image.

3. The system of claim 2 wherein the LMC is further configured to forward information relating to the loyalty amount and the device image from the OPE to the merchant server to allow the merchant server to seek approval of the transaction from the cardholder system by displaying some or all of the forwarded information to the cardholder.

4. The system of claim 3 wherein the LMC is further configured to forward processed payment information from the merchant server to the OPE to allow the OPE to instruct the cardholder system to update the portable device.

5. The system of claim 1 wherein the portable device includes at least one of a smartcard, a cellular phone, a personal digital assistant, a pager, a payment card, a security card, an access card, smart media and a transponder.

6. The system of claim 1 wherein the cardholder system includes at least one of a point-of-sale device, a cellular phone, a PDA, a computer, a handheld specialized reader, a set-top box, a kiosk, a security system, and an access system.

7. A system for processing transactions under a plurality of loyalty programs, comprising:
- a loyalty host configured to maintain corresponding rules and logic relating to the plurality of loyalty programs;
- a plurality of cardholder systems, each cardholder system configured to retrieve and forward respective device images from a plurality of portable devices, each device image including portable device information and loyalty program information relating to a cardholder;
- a plurality of merchant servers, each merchant server configured to provide respective transaction information relating to an associated transaction;
- a plurality of open programming engines (OPEs) configured to retrieve the corresponding rules and logic relating to the plurality of loyalty programs based on the respective transaction information relating to the transactions associated with one or more merchant servers and determine respective loyalty amounts for the transactions using the corresponding rules and logic and the respective device images; and
- a plurality of loyalty merchant components (LMCs) configured to facilitate interactions amongst the plurality of OPEs, the plurality of cardholder systems and the plurality of merchant servers for purposes of processing the transactions under the plurality of loyalty programs, wherein a first LMC is configured to receive the transaction information from the merchant server and forward the transaction information to the OPE and configured to receive the device image from the cardholder system and forward the device image to the OPE.

8. The system of claim 7 wherein at least one OPE is further configured to communicate with one or more LMCs.

9. The system of claim 7 wherein the first LMC is further configured to:
- receive a first transaction information for a first transaction from a first merchant server via a first cardholder system;
- forward the first transaction information to a first OPE to allow the first OPE to generate a transaction ID linked to the first transaction information;
- forward the transaction ID from the first OPE to the first cardholder system to allow a first device image to be linked to the transaction ID; and
- forward the first device image and the transaction ID from the first cardholder system to the first OPE to allow the first OPE to match the first transaction information to the first device image.

10. The system of claim 9 wherein the first LMC is further configured to forward information relating to a first loyalty amount and the first device image from the first OPE to the first merchant server to allow the first merchant server to seek approval of the first transaction from the first cardholder system by displaying some or all of the forwarded information to a first cardholder.

11. The system of claim 10 wherein the first LMC is further configured to forward processed payment information from the first merchant server to the first OPE to allow the first OPE to instruct the first cardholder system to update a first portable device having the first device image.

12. The system of claim 7 wherein the plurality of portable devices include at least one of a smartcard, a cellular phone, a personal digital assistant, a pager, a payment card, a security card, an access card, smart media and a transponder.

13. The system of claim 7 wherein the plurality of cardholder systems include at least one of a point-of-sale device, a cellular phone, a PDA, a computer, a handheld specialized reader, a set-top box, a kiosk, a security system, and an access system.

14. A method for processing a transaction in connection with a loyalty program using a system having a loyalty host, an open programming engine (OPE), a loyalty merchant component (LMC), a cardholder system and a merchant server, the method comprising:
- directing the merchant server to communicate with the cardholder system to determine whether a cardholder is eligible to participate in the loyalty program, the cardholder having a portable device, the portable device having stored thereon a device image, the device image including portable device information and loyalty program information relating to the cardholder;
- upon determining that the cardholder is eligible to participate in the loyalty program, directing the merchant server to forward transaction information to the cardholder system and redirect the cardholder system to communicate with the LMC and pass the transaction information to the LMC;
- passing the transaction information from the LMC to the OPE;
- directing the OPE to generate a transaction ID and linking the transaction ID to the transaction information;
- passing the transaction ID to the LMC;
- directing the LMC to forward a processing page to the cardholder system, the processing page including the transaction ID;
- directing the cardholder system to establish communication with the OPE using the processing page;
- directing the cardholder system to forward the device image retrieved from the portable device and the transaction ID to the OPE via the LMC;
- directing the OPE to match the transaction information with the device image using the transaction ID;
- directing the OPE to retrieve rules and logic pertaining to the loyalty program from the loyalty host based on the transaction information; and
- directing the OPE to use the rules and logic to determine a loyalty amount for the transaction based on the transaction information and the device image.

15. The method of claim 14 further comprising:
- directing the OPE to forward information relating to the loyalty amount and the device image to the merchant server via the LMC;
- directing the merchant server to seek approval of the transaction from the cardholder by displaying some or all of the forwarded information to the cardholder; and
- directing the merchant server to process payment for the transaction upon receiving approval from the cardholder.

16. The method of claim 15 further comprising:
- once payment is processed, directing the merchant server to forward processed payment information to the OPE via the LMC; and
- directing the OPE to instruct the cardholder system to update the portable device.

17. The method of claim 16 further comprising:
- directing the cardholder system to display information relating to the updated portable device to the cardholder.

18. The method of claim 15 further comprising:
  directing the merchant server to retrieve the device image from the cardholder system, the device image retrieved from the portable device offered by the cardholder for payment for the transaction; and
  directing the merchant server to compare some or all of the device image retrieved from the cardholder system with some or all of the device image forwarded by the OPE to ensure that the portable device offered for payment for the transaction is the same as the portable device determined to be eligible to participate in the loyalty program.

19. The method of claim 14 wherein determining whether the cardholder is eligible to participate in the loyalty program further comprises:
  checking whether the cardholder system includes a client loyalty component relating to the loyalty program.

20. The method of claim 14 wherein directing the merchant server to forward the transaction information to the cardholder system and redirect the cardholder system to communicate with the LMC and pass the transaction information to the LMC further comprises:
  directing the merchant server to forward a call to the cardholder system; and
  using the call to establish a communication session between the cardholder system and the LMC;
  wherein the call includes the transaction information.

21. The method of claim 20 wherein the call includes a script.

22. The method of claim 14 wherein the transaction information includes item purchased by the cardholder in the transaction, purchase amount and merchant identification information relating to a merchant associated with the merchant server.

23. The method of claim 14 further comprising:
  if the cardholder is determined to be eligible for two or more loyalty programs, directing the OPE to request the cardholder system to elect which one or more of the two or more loyalty programs are to apply for the transaction.

24. The method of claim 14 wherein the portable device includes at least one of a smartcard, a cellular phone, a personal digital assistant, a pager, a payment card, a security card, an access card, smart media and a transponder.

25. The method of claim 14 wherein the cardholder system includes at least one of a point-of-sale device, a cellular phone, a PDA, a computer, a handheld specialized reader, a set-top box, a kiosk, a security system, and an access system.

26. A method for handling a transaction in connection with a loyalty program using a system having a loyalty host, an open programming engine (OPE), a loyalty merchant component (LMC), a cardholder system and a merchant server, comprising:
  directing the cardholder system to communicate with the LMC upon determining that a cardholder is eligible to participate in the loyalty program, the cardholder having a portable device, the portable device having stored thereon a device image, the device image including loyalty program information relating to the cardholder;
  directing the cardholder system to forward transaction information relating to the transaction to the LMC;
  forwarding the transaction information to the OPE;
  directing the OPE to generate a transaction ID and linking the transaction ID to the transaction information;
  using the LMC to pass the transaction ID from the OPE to the cardholder system;
  directing the cardholder system to link the transaction ID received from the OPE with the device image retrieved from the portable device;
  using the LMC to forward the linked transaction ID and device image from the cardholder system to the OPE;
  directing the OPE to match the transaction information with the device image using the transaction ID;
  directing the OPE to retrieve rules and logic pertaining to the loyalty program from the loyalty host based on the transaction information; and
  directing the OPE to use the rules and logic to determine a loyalty amount for the transaction based on the transaction information and the matched device image.

27. The method of claim 26 further comprising:
  using the LMC to forward information relating to the loyalty amount and the device image from the OPE to the merchant server;
  directing the merchant server to seek approval of the transaction from the cardholder by displaying some or all of the forwarded information to the cardholder; and
  directing the merchant server to process payment for the transaction upon receiving approval from the cardholder.

28. The method of claim 27 further comprising:
  once payment is processed, using the LMC to forward processed payment information from the merchant server to the OPE; and
  directing the OPE to instruct the cardholder system to update the portable device.

29. The method of claim 28 further comprising:
  directing the cardholder system to display information relating to the updated portable device to the cardholder.

30. The method of claim 27 further comprising:
  directing the merchant server to retrieve the device image from the cardholder system, the device image retrieved from the portable device offered by the cardholder for payment for the transaction; and
  directing the merchant server to compare some or all of the device image retrieved from the cardholder system with some or all of the device image forwarded by the OPE to ensure that the portable device offered for payment for the transaction is the same as the portable device determined to be eligible to participate in the loyalty program.

31. The method of claim 26 wherein determining the cardholder is eligible to participate in the loyalty program further comprises:
  checking whether the cardholder system includes a client loyalty component relating to the loyalty program.

32. The method of claim 26 wherein directing the cardholder system to forward transaction information relating to the transaction to the LMC further comprises:
  directing the merchant server to forward a call to the cardholder system, the call including the transaction information;
  using the call to establish a communication session between the cardholder system and the LMC; and
  forwarding the transaction information from the cardholder system to the LMC during the communication session.

33. The method of claim 32 wherein the call includes a script.

34. The method of claim 26 wherein the transaction information includes item purchased by the cardholder in the transaction, purchase amount and merchant identification information relating to a merchant associated with the merchant server.

35. The method of claim 26 further comprising:
if the cardholder is determined to be eligible for two or more loyalty programs, directing the OPE to request the cardholder system to elect which one or more of the two or more loyalty programs are to apply for the transaction.

36. The method of claim 26 wherein the portable device includes at least one of a smartcard, a cellular phone, a personal digital assistant, a pager, a payment card, a security card, an access card, smart media and a transponder.

37. The method of claim 26 wherein the cardholder system includes at least one of a point-of-sale device, a cellular phone, a PDA, a computer, a handheld specialized reader, a set-top box, a kiosk, a security system, and an access system.

38. A system for processing a transaction under a loyalty program, comprising:
a loyalty host configured to maintain rules and logic relating to the loyalty program;
a cardholder system configured to retrieve and forward a device image from a portable device, the device image including portable device information and loyalty program information relating to a cardholder;
a merchant server configured to provide transaction information relating to the transaction;
an open programming engine (OPE) configured to retrieve the rules and logic relating to the loyalty program based on the transaction information and determine a loyalty amount for the transaction using the rules and logic and the device image; and
a loyalty merchant component (LMC) configured to facilitate interactions amongst the OPE, the cardholder system and the merchant server for purposes of processing the transaction under the loyalty program, wherein the OPE, cardholder system and merchant server are separate entities from each other and interact through the LMC.

39. The system of claim 38 wherein the LMC is further configured to:
receive the transaction information from the merchant server via the cardholder system;
forward the transaction information to the OPE to allow the OPE to generate a transaction ID linked to the transaction information;
forward the transaction ID from the OPE to the cardholder system to allow the device image to be linked to the transaction ID; and
forward the device image and the transaction ID from the cardholder system to the OPE to allow the OPE to match the transaction information to the device image.

40. The system of claim 38 wherein the LMC is further configured to forward information relating to the loyalty amount and the device image from the OPE to the merchant server to allow the merchant server to seek approval of the transaction from the cardholder system by displaying some or all of the forwarded information to the cardholder.

41. The system of claim 40 wherein the LMC is further configured to forward processed payment information from the merchant server to the OPE to allow the OPE to instruct the cardholder system to update the portable device.

42. The system of claim 38 wherein the portable device includes at least one of a smartcard, a cellular phone, a personal digital assistant, a pager, a payment card, a security card, an access card, smart media and a transponder.

43. The system of claim 38 wherein the cardholder system includes at least one of a point-of-sale device, a cellular phone, a PDA, a computer, a handheld specialized reader, a set-top box, a kiosk, a security system, and an access system.

* * * * *